US008154983B2

(12) United States Patent
Zhang et al.

(10) Patent No.: US 8,154,983 B2
(45) Date of Patent: Apr. 10, 2012

(54) SYSTEM AND METHOD FOR THE PLACEMENT OF RANK INFORMATION IN A PHYSICAL UPLINK SHARED CHANNEL

(75) Inventors: Jianzhong Zhang, Irving, TX (US); Joonyoung Cho, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 728 days.

(21) Appl. No.: 12/287,413

(22) Filed: Oct. 9, 2008

(65) Prior Publication Data

US 2009/0245170 A1    Oct. 1, 2009

Related U.S. Application Data

(60) Provisional application No. 61/064,764, filed on Mar. 25, 2008.

(51) Int. Cl.
*H04J 11/00* (2006.01)

(52) U.S. Cl. ......... 370/208; 370/203; 370/480; 375/260

(58) Field of Classification Search .................. 370/203, 370/208, 206, 281, 310, 319, 321, 327, 328, 370/329, 330, 340, 341, 343, 344, 431, 436, 370/441, 442, 444; 455/512, 513, 550.1, 455/552; 375/260, 295
See application file for complete search history.

(56) References Cited

U.S. PATENT DOCUMENTS

| | | | | |
|---|---|---|---|---|
| 7,929,415 | B2 * | 4/2011 | Kwak et al. ................. | 370/208 |
| 2006/0215777 | A1 * | 9/2006 | Krishnamoorthi ............ | 375/260 |
| 2007/0004465 | A1 * | 1/2007 | Papasakellariou et al. ... | 455/571 |
| 2007/0274340 | A1 * | 11/2007 | Raveendran et al. ......... | 370/468 |
| 2008/0200196 | A1 * | 8/2008 | Muharemovic et al. ...... | 455/512 |
| 2008/0267158 | A1 * | 10/2008 | Zhang et al. .................. | 370/342 |
| 2008/0279296 | A1 * | 11/2008 | Roh et al. ...................... | 375/260 |
| 2009/0046582 | A1 * | 2/2009 | Sarkar et al. ............... | 370/230.1 |
| 2009/0059844 | A1 * | 3/2009 | Ko et al. ....................... | 370/328 |
| 2009/0067391 | A1 * | 3/2009 | Shen et al. .................... | 370/336 |
| 2009/0073922 | A1 * | 3/2009 | Malladi et al. ............... | 370/328 |
| 2009/0080549 | A1 * | 3/2009 | Khan et al. .................... | 375/260 |
| 2009/0097466 | A1 * | 4/2009 | Lee et al. ....................... | 370/344 |
| 2009/0098899 | A1 * | 4/2009 | Gorokhov et al. ............ | 455/522 |
| 2009/0109873 | A1 * | 4/2009 | Shen et al. .................... | 370/254 |
| 2009/0110038 | A1 * | 4/2009 | Montojo et al. .............. | 375/211 |
| 2009/0116570 | A1 * | 5/2009 | Bala et al. ..................... | 375/260 |
| 2009/0201825 | A1 * | 8/2009 | Shen et al. .................... | 370/252 |
| 2009/0202008 | A1 * | 8/2009 | Suzuki .......................... | 375/260 |
| 2009/0207784 | A1 * | 8/2009 | Lee et al. ....................... | 370/328 |
| 2009/0207793 | A1 * | 8/2009 | Shen et al. .................... | 370/329 |
| 2009/0232067 | A1 * | 9/2009 | Pajukoski et al. ............ | 370/329 |
| 2009/0232070 | A1 * | 9/2009 | Muharemovic et al. ...... | 370/329 |
| 2009/0245170 | A1 * | 10/2009 | Zhang et al. .................. | 370/328 |
| 2009/0285193 | A1 * | 11/2009 | Kim et al. ..................... | 370/342 |
| 2010/0020894 | A1 * | 1/2010 | Chang et al. .................. | 375/295 |
| 2010/0027450 | A1 * | 2/2010 | Montojo et al. .............. | 370/311 |

(Continued)

*Primary Examiner* — Chi Pham
*Assistant Examiner* — Abdullah Riyami

(57) ABSTRACT

A wireless communication network includes a plurality of base stations capable of wireless communication with a plurality of subscriber stations within a coverage area of the network. At least one of the plurality of base stations is capable of selecting up to four orthogonal frequency-division multiplexing (OFDM) symbols in a subframe of a physical uplink shared channel. The up to four OFDM symbols are selected starting from the bottom a resource grid of the of the physical uplink shared channel in a bottom-up manner. And one or more rank information (RI) coded bits are repeated in each of the selected up to four OFDM symbols.

21 Claims, 8 Drawing Sheets

U.S. PATENT DOCUMENTS

| | | |
|---|---|---|
| 2010/0135273 A1* | 6/2010 | Kim ............................. 370/344 |
| 2010/0135360 A1* | 6/2010 | Kwak et al. .................. 375/135 |
| 2010/0165931 A1* | 7/2010 | Nimbalker et al. ........... 370/329 |
| 2010/0254331 A1* | 10/2010 | Kim et al. ..................... 370/329 |
| 2010/0272209 A1* | 10/2010 | Lee et al. ...................... 375/295 |
| 2010/0329220 A1* | 12/2010 | Kim et al. ..................... 370/336 |
| 2011/0009148 A1* | 1/2011 | Kotecha ........................ 455/513 |

\* cited by examiner

SYSTEM AND METHOD FOR THE PLACEMENT OF RANK INFORMATION IN A PHYSICAL UPLINK SHARED CHANNEL

CROSS-REFERENCE TO RELATED APPLICATION(S) AND CLAIM OF PRIORITY

The present application is related to U.S. Provisional Patent No. 61/064,764, filed Mar. 25, 2008, entitled "METHODS OF MULTIPLEXING DATA AND CONTROL IN UPLINK CHANNEL". Provisional Patent No. 61/064,764 is assigned to the assignee of the present application and is hereby incorporated by reference into the present application as if fully set forth herein. The present application hereby claims priority under 35 U.S.C. §119(e) to U.S. Provisional Patent No. 61/064,764.

TECHNICAL FIELD OF THE INVENTION

The present application relates generally to wireless communications and, more specifically, to the placement of rank information in a physical uplink shared channel.

BACKGROUND OF THE INVENTION

With regard to the multiplexing of control information with data on a physical uplink shared channel (PUSCH), it has been proposed to place the ACK/NACK (A/N) resources next to the reference signal. The reporting of rank information (RI) and control information (for example, quality information/precoding matrix index (CQI/PMI)) on a PUSCH, where RI information and control information are always reported in the same subframe, has also been proposed. The reporting may be periodic or aperiodic, and the control is calculated assuming the simultaneously reported RI.

As shown in FIG. 3, the A/N resources 302 are punctured into the data resources 304 from the bottom up and two symbols away from reference signal sources 306. Control resources 308 are placed at the beginning of the data resources. The maximum number of resources available for A/N information is four single carrier-frequency division multiple access (SC-FDMA) symbols.

Therefore, there is a need in the art for an improved system and method for reporting RI. In particular, there is a need for a technique that allows RI to be reported in the data resources of a PUSCH.

SUMMARY OF THE INVENTION

A wireless communication network comprising a plurality of base stations capable of wireless communication with a plurality of subscriber stations within a coverage area of the network, wherein at least one of the plurality of base stations is capable of selecting two or more orthogonal frequency-division multiplexing (OFDM) symbols in a subframe of a physical uplink shared channel, the two or more OFDM symbols are selected starting from the bottom of the physical uplink shared channel in a bottom-up manner, and repeating one or more rank information (RI) coded bits in each of the selected two or more OFDM symbols.

A base station capable of wireless communication with a plurality of subscriber stations within a coverage area of a network, where the base station is capable of puncturing one or more rank information (RI) resources into data resources of a physical uplink shared channel, wherein the one or more RI resources are punctured starting from the bottom of the physical uplink shared channel in a bottom-up manner.

A method of operating a base station comprising replacing two or more data resources in a subframe of a physical uplink shared channel with one or more rank information (RI) resources, wherein the two or more data resources are replaced starting from the bottom of the physical uplink shared channel in a bottom-up manner and are separated from a reference signal resource in the physical uplink shared channel by at least one resource which does not contain the one or more RI resources.

Before undertaking the DETAILED DESCRIPTION OF THE INVENTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION OF THE INVENTION

FIGS. 1 through 8, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged wireless communication system.

With regard to the following description, it is noted that the LTE term "node B" is another term for "base station" used below. Also, the LTE term "user equipment" or "UE" is another term for "subscriber station" used below.

Figure 1:
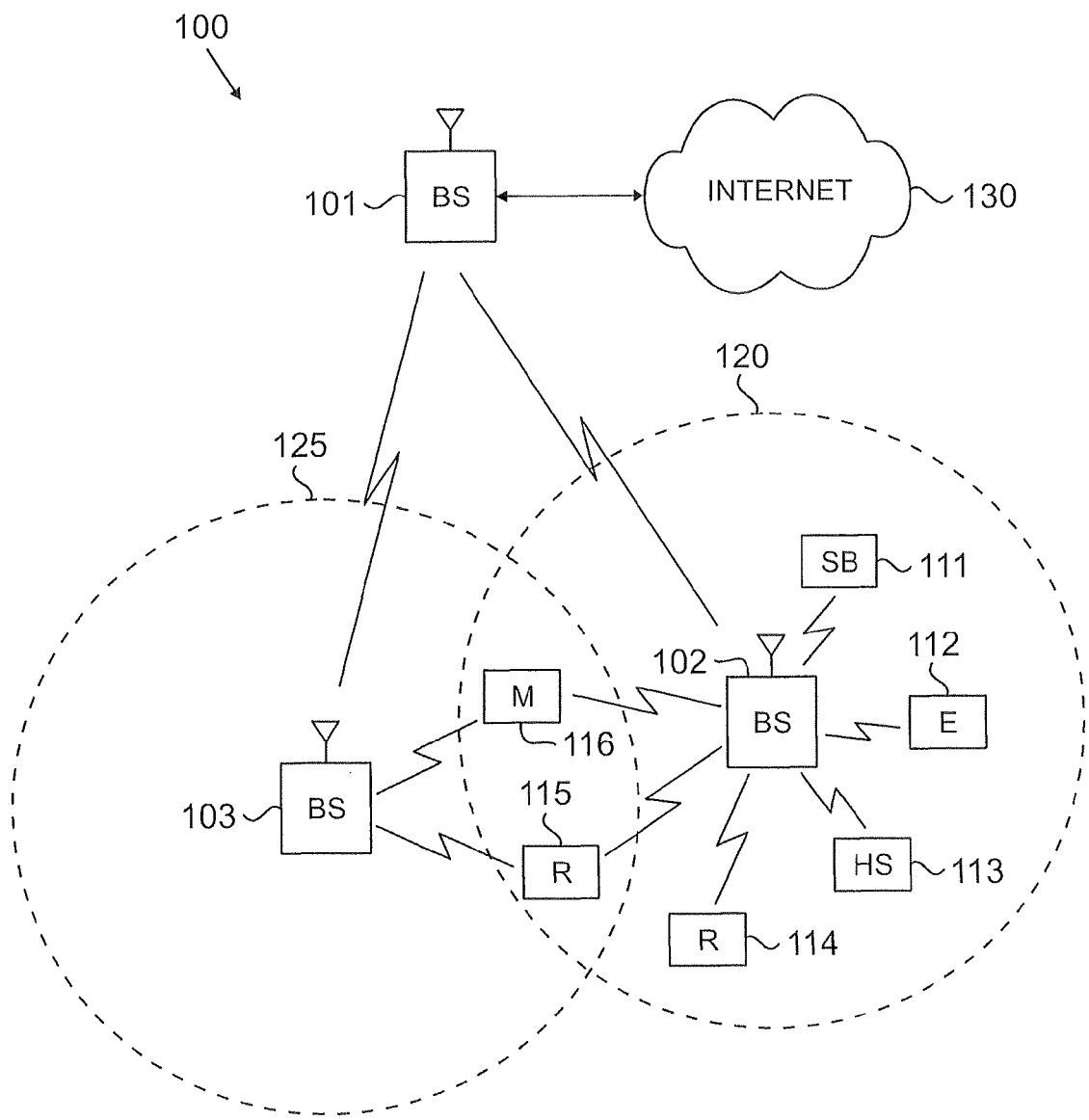
FIG. 1 illustrates an exemplary wireless network that transmits ACK/NACK messages in the uplink according to the principles of the present disclosure.

FIG. 1 illustrates exemplary wireless network 100, which transmits ACK/NACK messages according to the principles of the present disclosure. In the illustrated embodiment, wireless network 100 includes base station (BS) 101, base station (BS) 102, base station (BS) 103, and other similar base stations (not shown). Base station 101 is in communication with base station 102 and base station 103. Base station 101 is also in communication with Internet 130 or a similar IP-based network (not shown).

Base station 102 provides wireless broadband access (via base station 101) to Internet 130 to a first plurality of subscriber stations within coverage area 120 of base station 102. The first plurality of subscriber stations includes subscriber station 111, which may be located in a small business (SB), subscriber station 112, which may be located in an enterprise (E), subscriber station 113, which may be located in a WiFi hotspot (HS), subscriber station 114, which may be located in a first residence (R), subscriber station 115, which may be located in a second residence (R), and subscriber station 116, which may be a mobile device (M), such as a cell phone, a wireless laptop, a wireless PDA, or the like.

Base station 103 provides wireless broadband access (via base station 101) to Internet 130 to a second plurality of subscriber stations within coverage area 125 of base station 103. The second plurality of subscriber stations includes subscriber station 115 and subscriber station 116. In an exemplary embodiment, base stations 101-103 may communicate with each other and with subscriber stations 111-116 using OFDM or OFDMA techniques.

Base station 101 may be in communication with either a greater number or a lesser number of base stations. Furthermore, while only six subscriber stations are depicted in FIG. 1, it is understood that wireless network 100 may provide wireless broadband access to additional subscriber stations. It is noted that subscriber station 115 and subscriber station 116 are located on the edges of both coverage area 120 and coverage area 125. Subscriber station 115 and subscriber station 116 each communicate with both base station 102 and base station 103 and may be said to be operating in handoff mode, as known to those of skill in the art.

Subscriber stations 111-116 may access voice, data, video, video conferencing, and/or other broadband services via Internet 130. In an exemplary embodiment, one or more of subscriber stations 111-116 may be associated with an access point (AP) of a WiFi WLAN. Subscriber station 116 may be any of a number of mobile devices, including a wireless-enabled laptop computer, personal data assistant, notebook, handheld device, or other wireless-enabled device. Subscriber stations 114 and 115 may be, for example, a wireless-enabled personal computer (PC), a laptop computer, a gateway, or another device.

Figure 2A:
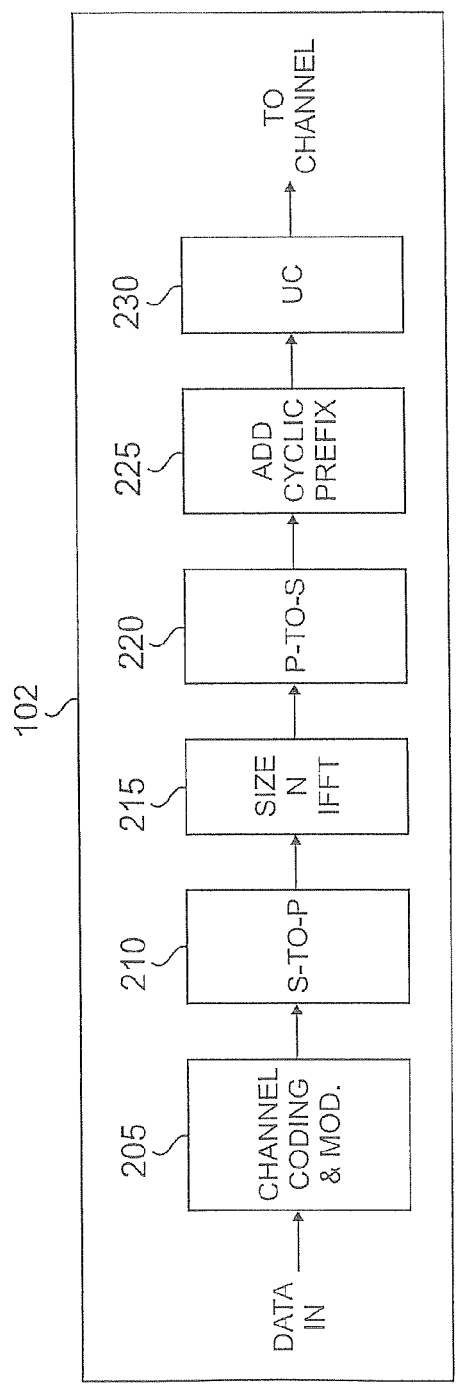
FIG. 2A is a high-level diagram of an OFDMA transmitter according to one embodiment of the present disclosure.
Figure 2B:
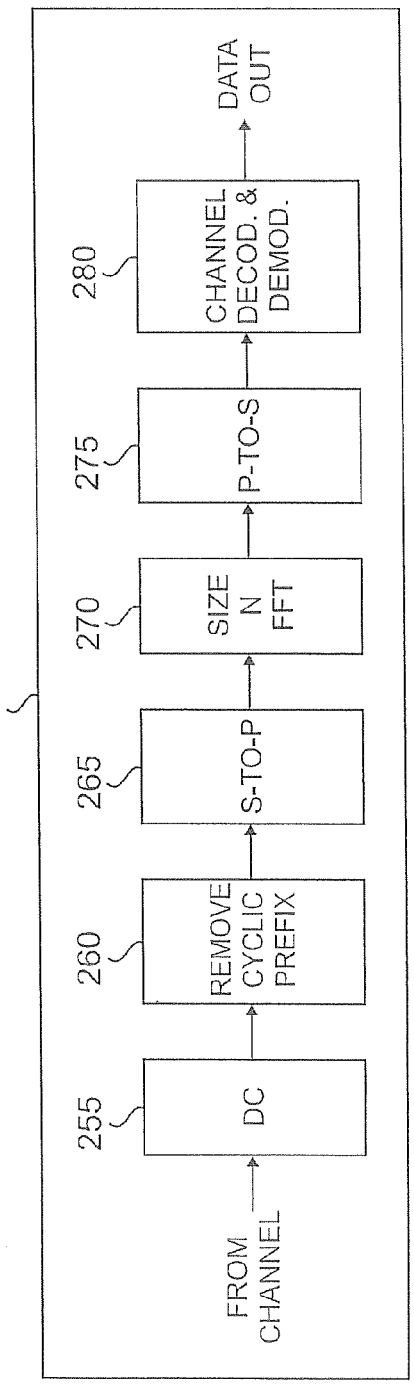
FIG. 2B is a high-level diagram of an OFDMA receiver according to one embodiment of the present disclosure.
Figure 3:
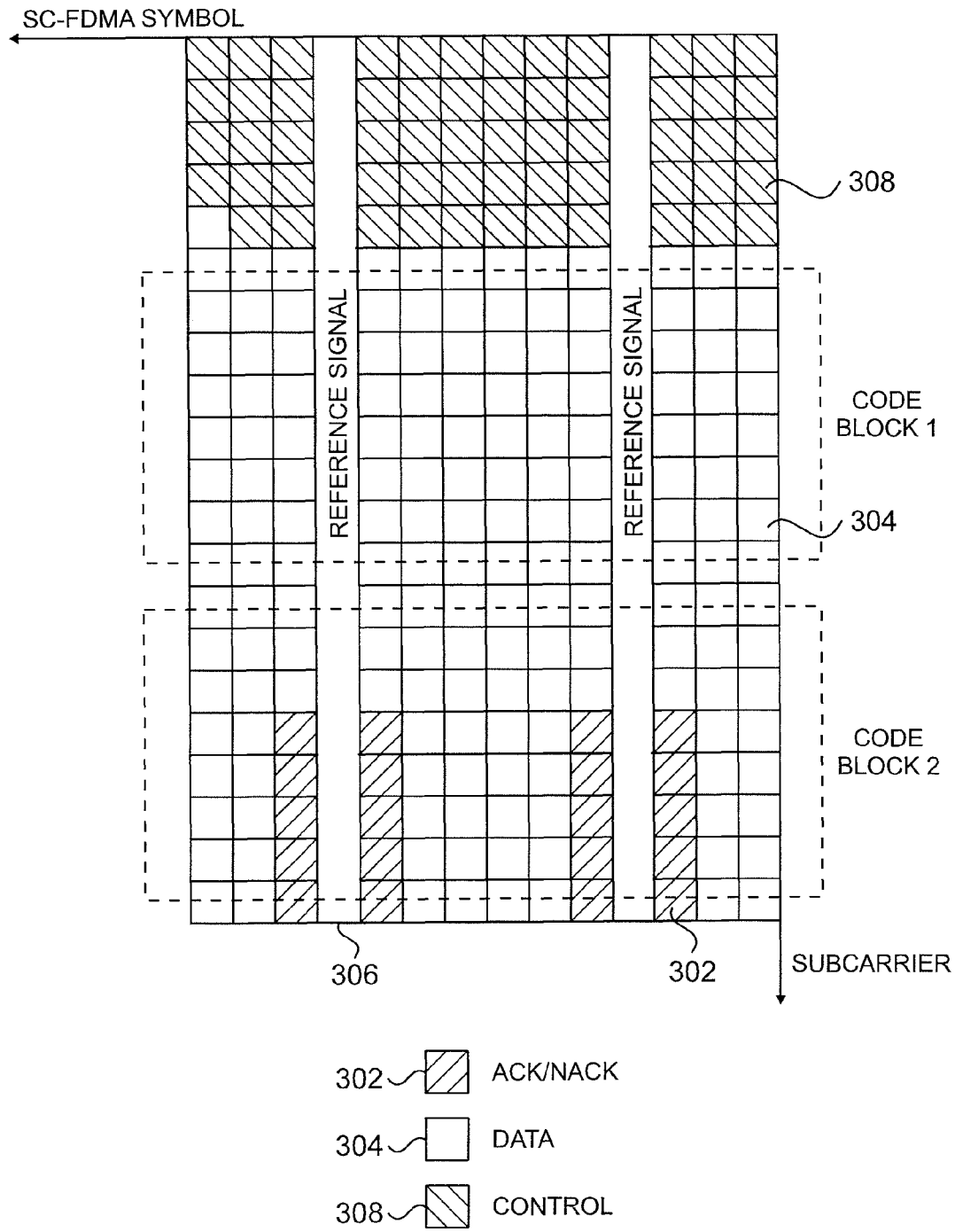
FIG. 3 illustrates a multiplexing of control resources, data resources, and ACK/NACK resources on a physical uplink shared channel (PUSCH)

FIG. 2A is a high-level diagram of an orthogonal frequency division multiple access (OFDMA) transmit path. FIG. 2B is a high-level diagram of an orthogonal frequency division multiple access (OFDMA) receive path. In FIGS. 2A and 2B, the OFDMA transmit path is implemented in base station (BS) 102 and the OFDMA receive path is implemented in subscriber station (SS) 116 for the purposes of illustration and explanation only. However, it will be understood by those skilled in the art that the OFDMA receive path may also be implemented in BS 102 and the OFDMA transmit path may be implemented in SS 116.

The transmit path in BS 102 comprises channel coding and modulation block 205, serial-to-parallel (S-to-P) block 210, Size N Inverse Fast Fourier Transform (IFFT) block 215, parallel-to-serial (P-to-S) block 220, add cyclic prefix block 225, up-converter (UC) 230. The receive path in SS 116 comprises down-converter (DC) 255, remove cyclic prefix block 260, serial-to-parallel (S-to-P) block 265, Size N Fast Fourier Transform (FFT) block 270, parallel-to-serial (P-to-S) block 275, channel decoding and demodulation block 280.

At least some of the components in FIGS. 2A and 2B may be implemented in software while other components may be implemented by configurable hardware or a mixture of software and configurable hardware. In particular, it is noted that the FFT blocks and the IFFT blocks described in this disclosure document may be implemented as configurable software algorithms, where the value of Size N may be modified according to the implementation.

Furthermore, although this disclosure is directed to an embodiment that implements the Fast Fourier Transform and the Inverse Fast Fourier Transform, this is by way of illustration only and should not be construed to limit the scope of the disclosure. It will be appreciated that in an alternate embodiment of the disclosure, the Fast Fourier Transform functions and the Inverse Fast Fourier Transform functions may easily be replaced by Discrete Fourier Transform (DFT) functions and Inverse Discrete Fourier Transform (IDFT) functions, respectively. It will be appreciated that for DFT and IDFT functions, the value of the N variable may be any integer number (i.e., 1, 2, 3, 4, etc.), while for FFT and IFFT functions, the value of the N variable may be any integer number that is a power of two (i.e., 1, 2, 4, 8, 16, etc.).

In BS 102, channel coding and modulation block 205 receives a set of information bits, applies coding (e.g., Turbo coding) and modulates (e.g., QPSK, QAM) the input bits to produce a sequence of frequency-domain modulation symbols. Serial-to-parallel block 210 converts (i.e., de-multiplexes) the serial modulated symbols to parallel data to produce N parallel symbol streams where N is the IFFT/FFT size used in BS 102 and SS 116. Size N IFFT block 215 then performs an IFFT operation on the N parallel symbol streams to produce time-domain output signals. Parallel-to-serial block 220 converts (i.e., multiplexes) the parallel time-domain output symbols from Size N IFFT block 215 to produce a serial time-domain signal. Add cyclic prefix block 225 then inserts a cyclic prefix to the time-domain signal. Finally, up-converter 230 modulates (i.e., up-converts) the output of add cyclic prefix block 225 to RF frequency for transmission via a wireless channel. The signal may also be filtered at baseband before conversion to RF frequency.

The transmitted RF signal arrives at SS 116 after passing through the wireless channel and reverse operations to those at BS 102 are performed. Down-converter 255 down-converts the received signal to baseband frequency and remove cyclic prefix block 260 removes the cyclic prefix to produce the serial time-domain baseband signal. Serial-to-parallel block 265 converts the time-domain baseband signal to parallel time domain signals. Size N FFT block 270 then performs an FFT algorithm to produce N parallel frequency-domain signals. Parallel-to-serial block 275 converts the parallel frequency-domain signals to a sequence of modulated data symbols. Channel decoding and demodulation block 280 demodulates and then decodes the modulated symbols to recover the original input data stream.

Each of base stations 101-103 may implement a transmit path that is analogous to transmitting in the downlink to subscriber stations 111-116 and may implement a receive path that is analogous to receiving in the uplink from subscriber stations 111-116. Similarly, each one of subscriber stations 111-116 may implement a transmit path corresponding to the architecture for transmitting in the uplink to base stations 101-103 and may implement a receive path corresponding to the architecture for receiving in the downlink from base stations 101-103.

The present disclosure describes a method and system for placing rank information in a physical uplink shared channel (PUSCH).

Figure 4:
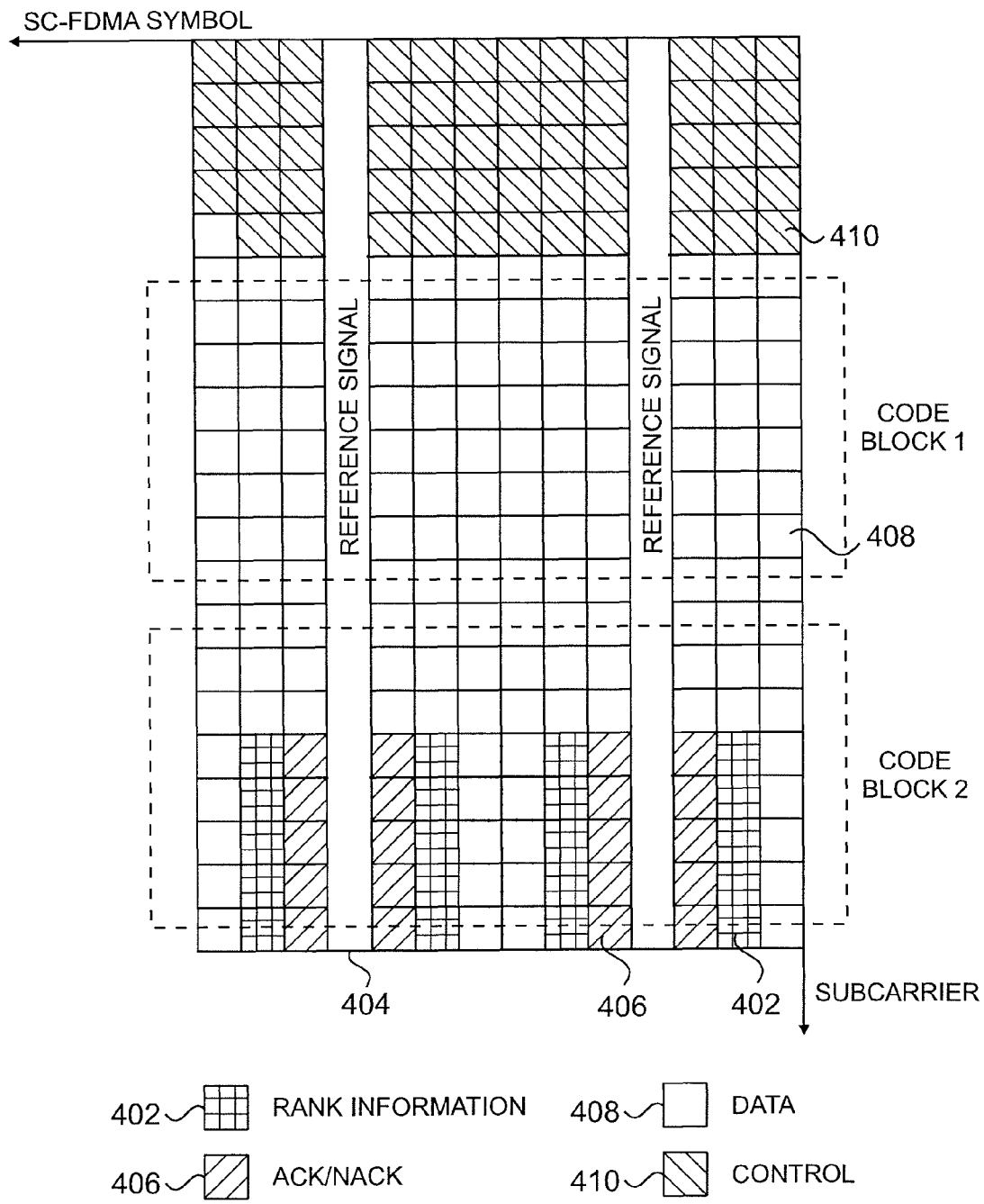
FIG. 4 illustrates the placement of rank information (RI) in a PUSCH according to a first embodiment the present disclosure.

FIG. 4 illustrates the placement of rank information (RI) in a physical uplink shared channel (PUSCH) according to a first embodiment the present disclosure. In this embodiment, RI coded bits 402 are repeated two or more times in one subframe starting from the bottom up. RI coded bits 402 are placed such that RI coded bits 402 are separated from reference signals 404 by at least one SC-FDMA symbol. In this particular example, RI coded bits 402 are repeated four times in four OFDM symbols and are placed two symbols away from reference signals 404. A/N bits 406, data bits 408, and control bits 410 also are shown.

Figure 5:
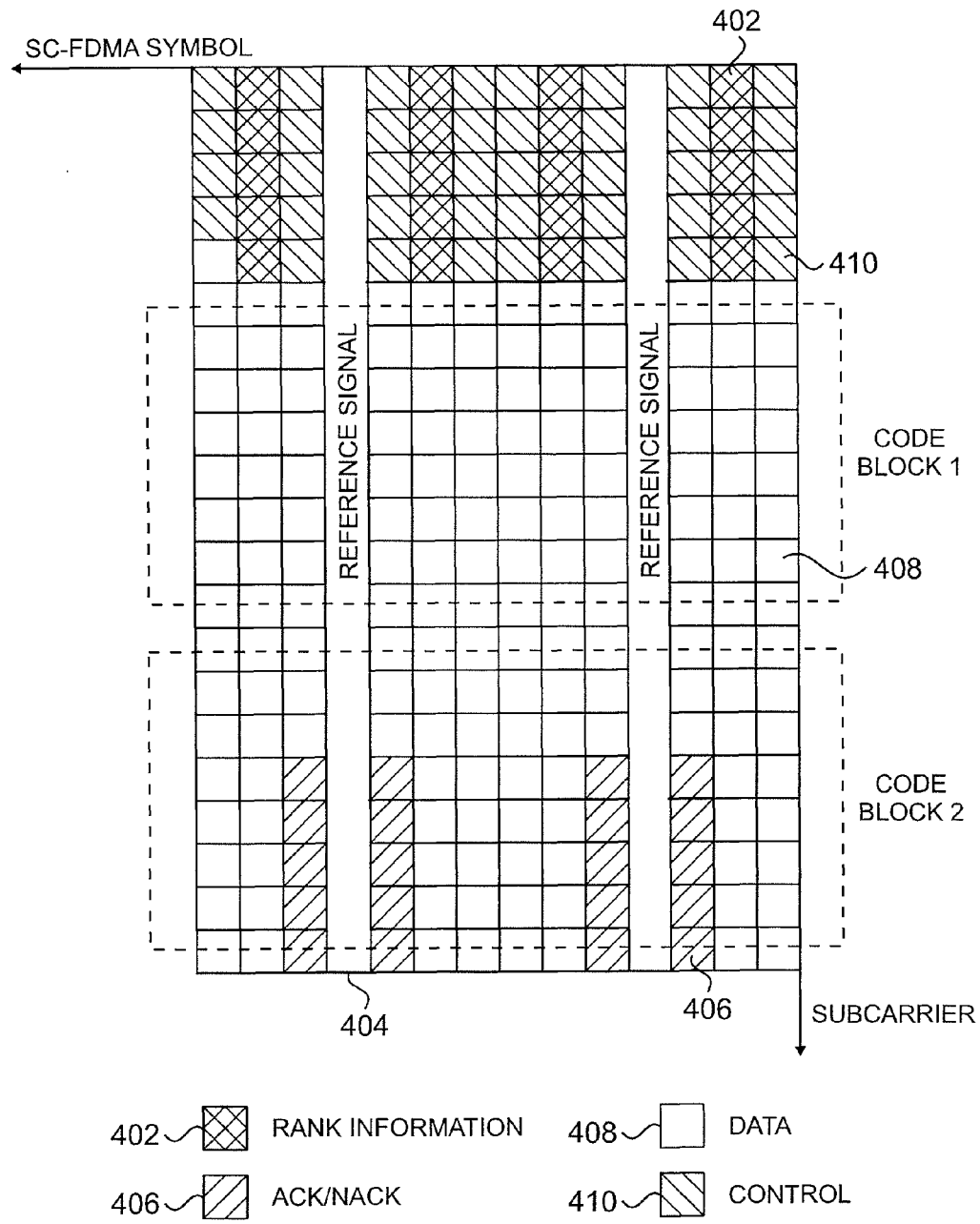
FIG. 5 illustrates the placement of RI in a PUSCH according to a second embodiment the present disclosure.

FIG. 5 illustrates the placement of RI in a PUSCH according to a second embodiment the present disclosure. In this embodiment, RI coded bits 402 are placed starting from the top down. In this particular example, RI coded bits 402 are repeated four times in four OFDM symbols in one subframe and are placed two symbols away from reference signals 404.

According to a third embodiment of the present disclosure, the RI bits are jointly coded with the control bits. The control bits may include CQI and PMI. In this embodiment, rank bits $[o_0^{RI}]$ or $[o_1^{RI}, o_0^{RI}]$ are first coded using a subcode before being jointly coded with the control bits $o_0, o_1, o_2, \ldots o_{o-1}$ into Q coded bits.

According to one example of this embodiment (assuming the number of coded bits after the RI sub-code is $Q_{RI}$), if there is only one rank bit, denoted by $o_0^{RI}$, then the one rank bit is repeated $Q_{RI}$ times to form the codeword.

If there are two rank bits (denoted by $[o_1^{RI}, o_0^{RI}]$), two approaches may be used. With the first approach, the two rank bits are simply repeated $\lfloor Q_{RI}/2 \rfloor$ times to form the codeword if $Q_{RI}$ is an even number. For example, if $Q_{RI}=4$, the codeword is given by $[o_1^{RI}, o_0^{RI}, o_1^{RI}, o_0^{RI}]$. If $Q_{RI}$ is not an even number, the codeword is concatenated with $o_1^{RI}$ or $o_0^{RI}$.

With the second approach, to form the coded bits for the two rank bits $[o_1^{RI}, o_0^{RI}]$, the two rank bits are mapped to a 3-bit codeword according to the simplex (3,2) code shown in Table 1 below.

TABLE 1 component simplex (3, 2) code used for two rank bits.

| Two information bits (either A/N bits or rank bits) | Component codeword $c_1c_2c_3$ (Simplex (3, 2) codebook) |
| --- | --- |
| 00 | 000 |
| 01 | 011 |
| 10 | 101 |
| 11 | 110 |

The codeword is repeated $\lfloor Q_{RI}/3 \rfloor$ times, and the resulting sequence is concatenated with the first $Q_{RI}-3*\lfloor Q_{RI}/2 \rfloor$ bits in the codeword $c_1c_2c_3$. This concatenated bit sequence is the final coded bit sequence to be modulated and mapped into the channel sequence.

Figure 6:
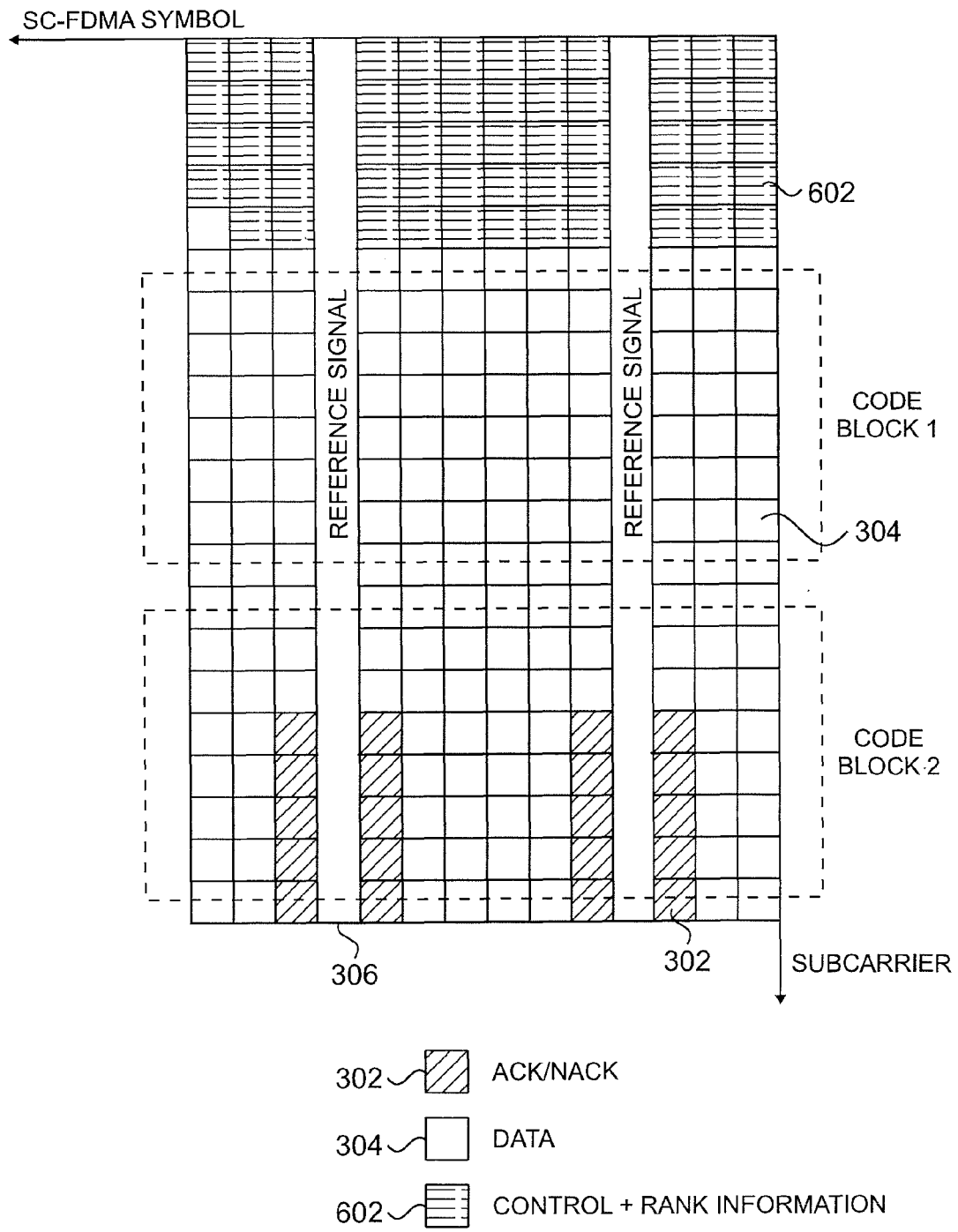
FIG. 6 illustrates the placement of RI in a PUSCH according to a third embodiment the present disclosure.

FIG. 6 illustrates an example of the placement of RI in a PUSCH according to the third embodiment of the present disclosure. In this embodiment, resources 602 contain jointly coded RI bits and control bits such as CQI and PMI.

According to a fourth embodiment of the present disclosure, the RI bits are jointly coded with ACK/NACK (A/N) bits using a linear block code. The joint coding block takes rank bit(s) $[o_0^{RI}]$ or $[o_1^{RI}, o_0^{RI}]$ together with A/N bit(s) $[o_0^{ACK}]$ or $[o_1^{ACK}, o_0^{ACK}]$ as input and produces output bits $[q_0^{A+R}, q_1^{A+R}, \ldots q_{Q_{A+R}}^{A+R}]$. In one embodiment, if there are no A/N bits to be transmitted in a given subframe, the UE sends a default value of (NACK) in the case of one A/N bit and (NACK, NACK) in the case of two A/N bits.

Figure 7:
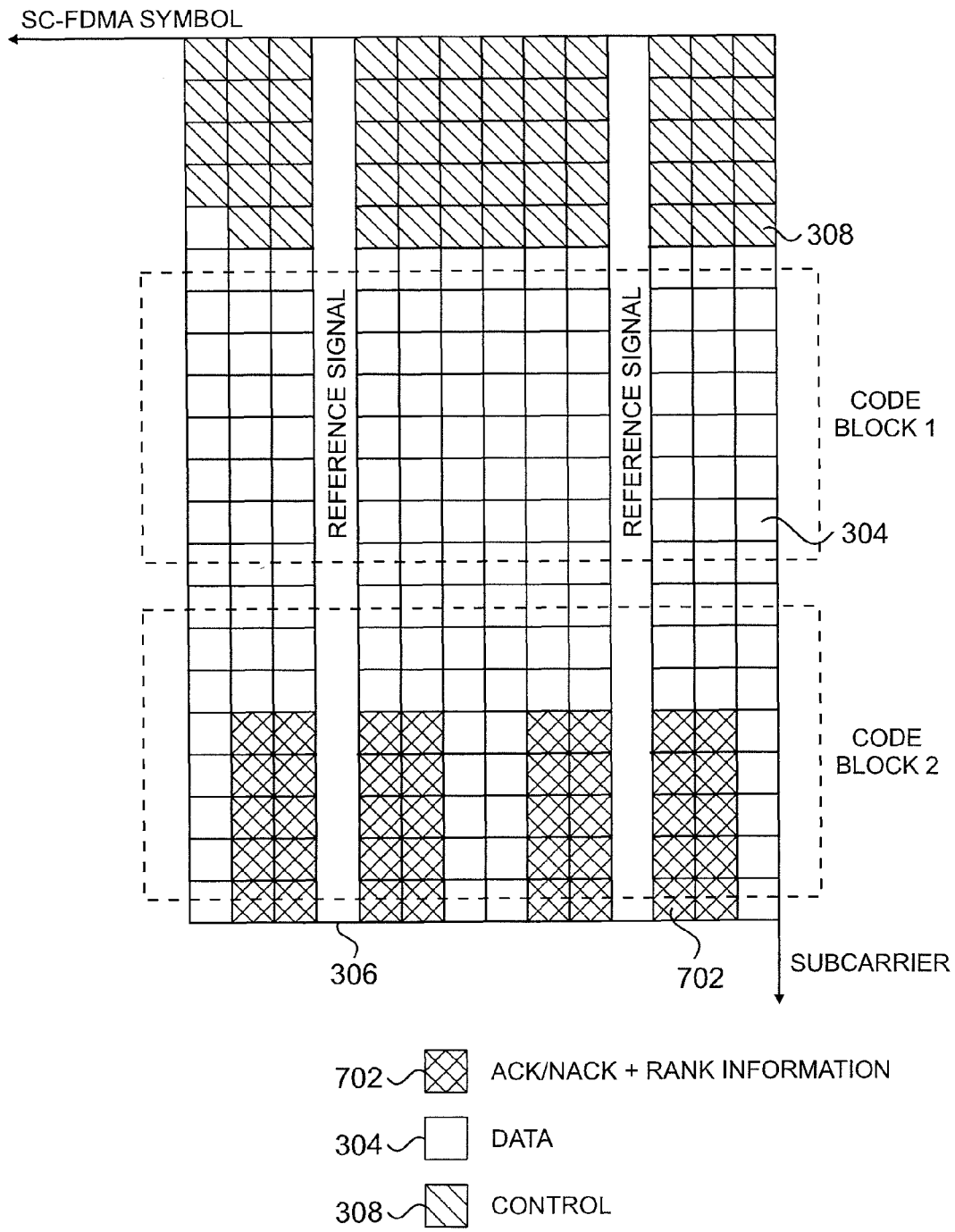
FIG. 7 illustrates the placement of RI in a PUSCH according to a fourth embodiment the present disclosure.

FIG. 7 illustrates an example of the placement of RI in a PUSCH according to the fourth embodiment of the present disclosure. Resources 702 contain jointly coded RI bits and A/N bits and are repeated four times in eight OFDM symbols. In this particular example, each repetition is placed on the symbols next to the reference signal symbols starting from the bottom up.

Figure 8:
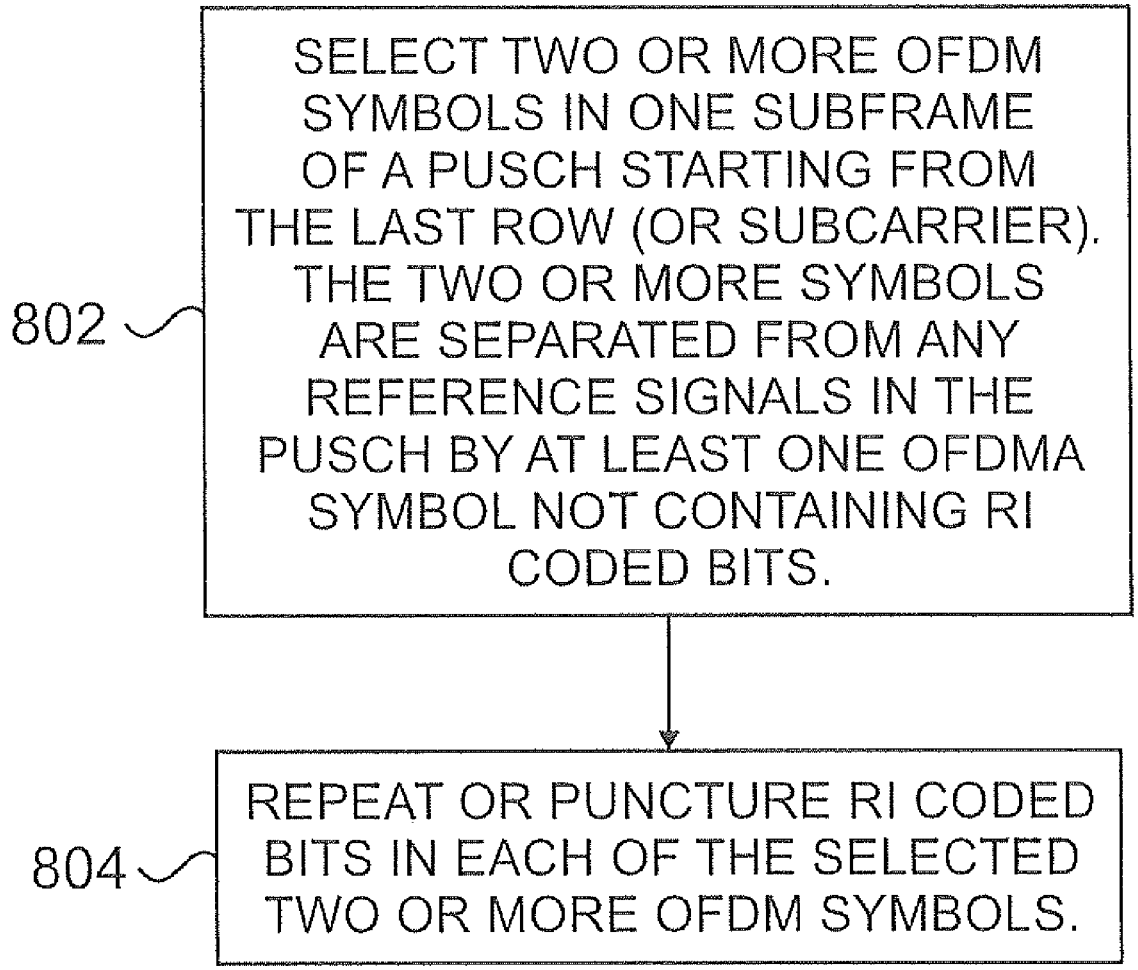
FIG. 8 illustrates a method of placing RI in a PUSCH according to an embodiment of the present disclosure.

FIG. 8 illustrates a method of placing rank information (RI) in a physical uplink shared channel (PUSCH) according to an embodiment of the present disclosure. In step 802, a base station or Node-B selects two or more OFDM symbols in one subframe of a PUSCH starting from the last row (or subcarrier). The base station selects symbols that separated from any reference signals in the PUSCH by at least one OFDMA symbol not containing RI coded bits. In step 804, the base station repeats or punctures RI coded bits in each of the selected two or more OFDM symbols. For example, the RI coded bits may be repeated or punctured four times in four OFDM symbols in one subframe and placed two symbols away from any reference signals as illustrated in FIG. 4. In other embodiments, step 804 would involve replacing two or more data resources in the two or more OFDM symbols with the RI coded bits.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. A method in a user equipment (UE) for transmitting control information and user data in a communication system, the method comprising:
    modulating encoded rank information bits and encoded uplink (UL) data based on a corresponding modulation scheme;
    mapping modulated rank information and at least one modulated UL data in a subframe of a physical uplink shared channel, the subframe comprising two slots, each slot comprising a reference signal;
    transmitting the subframe including the rank information and the UL data,
    wherein the modulated rank information is mapped to a Single Carrier Frequency Division Multiplexing Access (SC-FDMA) symbol that is separated from the reference signal by at least one symbol, and
    wherein when the rank information comprises two rank information bits, the two rank information bits are encoded according to a repeated simplex (3,2) code.

2. The method of claim 1, wherein the two rank information bits are mapped to a three-bit codeword.

3. The method of claim 2, wherein the three-bit codeword is repeated to form a repeated three-bit codeword.

4. The method of claim 3, wherein at least a portion of the three-bit codeword is concatenated with the repeated three-bit codeword.

5. The method of claim 1, wherein mapping the modulated rank information comprises:
   mapping the modulated rank information onto at most four SC-FDMA symbols selected in the subframe.

6. The method of claim 5, wherein the at most four SC-FDMA symbols correspond to up to four of the second, fifth, eighth, and eleventh symbols of the subframe.

7. The method of claim 5, wherein each of the at most four SC-FDMA symbols is separated from a reference signal by one symbol.

8. An apparatus of a user equipment (UE) for transmitting control information and user data in a communication system, the apparatus comprising:
   a channel coding and modulation block configured to:
      modulate encoded rank information bits and encoded uplink (UL) data based on a corresponding modulation scheme; and
      map modulated rank information and at least one modulated UL data in a subframe of a physical uplink shared channel, the subframe comprising two slots, each slot comprising a reference signal; and
   a transmitter configured to transmit the subframe including the rank information and the UL data,
   wherein the modulated rank information is mapped to a Single Carrier Frequency Division Multiplexing Access (SC-FDMA) symbol that is separated from the reference signal by at least one symbol, and
   wherein when the rank information comprises two rank information bits, the two rank information bits are encoded according to a repeated simplex (3,2) code.

9. The apparatus of claim 8, wherein the two rank information bits are mapped to a three-bit codeword.

10. The apparatus of claim 9, wherein the three-bit codeword is repeated to form a repeated three-bit codeword.

11. The apparatus of claim 10, wherein at least a portion of the three-bit codeword is concatenated with the repeated three-bit codeword.

12. The apparatus of claim 8, wherein the channel coding and modulation block is configured to map the modulated rank information by mapping the modulated rank information onto at most four SC-FDMA symbols selected in the subframe.

13. The apparatus of claim 12, wherein the at most four SC-FDMA symbols correspond to up to four of the second, fifth, eighth, and eleventh symbols of the subframe.

14. The apparatus of claim 12, wherein each of the at most four SC-FDMA symbols is separated from a reference signal by one symbol.

15. A system for communicating control information and user data, the system comprising:
   a base station; and
   a user equipment (UE) configured to:
      modulate encoded rank information bits and encoded uplink (UL) data based on a corresponding modulation scheme;
      map modulated rank information and at least one modulated UL data in a subframe of a physical uplink shared channel, the subframe comprising two slots, each slot comprising a reference signal; and
      transmit the subframe including the rank information and the UL data to the base station,
   wherein the modulated rank information is mapped to a Single Carrier Frequency Division Multiplexing Access (SC-FDMA) symbol that is separated from the reference signal by at least one symbol, and
   wherein when the rank information comprises two rank information bits, the two rank information bits are encoded according to a repeated simplex (3,2) code.

16. The system of claim 15, wherein the two rank information bits are mapped to a three-bit codeword.

17. The system of claim 16, wherein the three-bit codeword is repeated to form a repeated three-bit codeword.

18. The system of claim 17, wherein at least a portion of the three-bit codeword is concatenated with the repeated three-bit codeword.

19. The system of claim 15, wherein the UE is configured to map the modulated rank information by mapping the modulated rank information onto at most four SC-FDMA symbols selected in the subframe.

20. The system of claim 19, wherein the at most four SC-FDMA symbols correspond to up to four of the second, fifth, eighth, and eleventh symbols of the subframe.

21. The system of claim 19, wherein each of the at most four SC-FDMA symbols is separated from a reference signal by one symbol.

* * * * *